United States Patent [19]
Link et al.

[11] Patent Number: 5,906,460
[45] Date of Patent: May 25, 1999

[54] TOOL DEVICE

[75] Inventors: Hans-Jörg Link, Stuttgart; Bernd Höfflinger, Sindelfingen, both of Germany

[73] Assignee: Joh. & Ernst Link GmbH & Co. KG, Stuttgart, Germany

[21] Appl. No.: 08/850,629

[22] Filed: May 2, 1997

[30] Foreign Application Priority Data

May 4, 1996 [DE] Germany .................... 196 17 887

[51] Int. Cl.⁶ .................................................. B23C 1/00
[52] U.S. Cl. ........................... 409/186; 409/80; 356/376
[58] Field of Search .................. 408/13, 12, 8, 408/16, 224; 409/79, 80, 186, 188, 195, 193; 356/376, 241

[56] References Cited

U.S. PATENT DOCUMENTS

| | | |
|---|---|---|
| 4,018,113 | 4/1977 | Blazenin et al. ................. 409/80 |
| 4,420,253 | 12/1983 | Pryor .............................. 408/16 |
| 4,533,285 | 8/1985 | Jorgensen ........................ 408/224 |
| 4,968,146 | 11/1990 | Heizmann et al. ................ 408/16 |
| 5,277,529 | 1/1994 | Anders et al. ................... 409/193 |
| 5,335,061 | 8/1994 | Yamanoto et al. ................ 356/241 |

*Primary Examiner*—Andrea L. Pitts
*Assistant Examiner*—Adesh Bhargava
*Attorney, Agent, or Firm*—Robert W. Becker & Associates

[57] ABSTRACT

A tool device for machining workpieces has a machining tool and at least one sensor oriented toward a machining area of a workpiece to be machined by the machining tool. The at least one sensor senses at least a portion of the machining area and produces sensing signals. At least one processing unit for receiving and processing the sensing signals of the at least one sensor is provided so that an on-line control of the machining process is possible.

32 Claims, 8 Drawing Sheets

Fig. 6

TOOL DEVICE

BACKGROUND OF THE INVENTION

The present invention relates to a tool device for machining workpieces comprising a machining tool with a machining portion and a clamping shaft which is received in a tool receiving unit.

When machining workpieces, it is in general required that the machining precision corresponds to certain specifications. For example, a bore must have a circular cross-section and may not have any non-circular portions. In order to monitor the machining quality, the workpieces, after machining, are either manually tested or tested on testing stations with regard to the required machining quality. When a machining error is found, the workpiece must either be remachined or is rejected. A remachining process for the workpiece requires additional machining time.

It is therefore an object of the present invention to provide a tool device of the aforementioned kind such that the required machining quality can be complied with in a simple and reliable manner.

SUMMARY OF THE INVENTION

A tool device for machining workpieces according to the present invention is primarily characterized by:

A machining tool;

At least one sensor oriented toward a machining area of a workpiece to be machined by the machining tool, wherein the at least one sensor senses at least a portion of the machining area and produces sensing signals;

At least one processing unit for receiving and processing the sensing signals of the at least one sensor.

The at least one sensor is preferably connected to the exterior of the machining tool.

The machining tool may comprise a machining portion and the at least one sensor may be connected to the machining portion.

The machining tool has preferably a neck and the at least one sensor is connected to the neck.

The at least one sensor may be positioned inside the machining tool.

The tool device may further comprise a tool receiving unit for receiving the machining tool, wherein the at least one sensor is connected to the exterior of the tool receiving unit.

Advantageously, the at least one sensor is positioned inside the tool receiving unit.

The at least one sensor may be a photodiode or a photodiode array.

The at least one sensor may be an endoscopic optical system.

The endoscopic optical system extends preferably through the machining tool and comprises a tube having at a free end thereof a monitoring member.

The machining tool may comprise at least one view port for the monitoring member.

The machining tool comprises at least one fixedly attached reticle plate positioned within a viewing direction of the monitoring member.

The machining tool comprises a machining portion and the reticle plate is located in a bore of the machining portion.

The tool device may further comprise a data conversion module wherein the at least one sensor is connected to the data processing module.

The data conversion module is preferably connected within the machining tool.

The tool device may further comprise a clamping shaft for clamping the machining tool, wherein the data processing module is positioned within the clamping shaft.

The tool device may further comprise a tool receiving unit for receiving the machining tool, wherein the data processing module is mounted within the tool receiving unit.

The data processing module preferably comprises a signal processor.

The data processing module may comprise a data memory connected downstream of the signal processor.

The tool device may further comprise an analog-digital convertor connected upstream of the data processing module.

A tool device may further comprise a multiplexer to which the at least one sensor is connected.

The analog-digital convertor may be connected between the multiplexer and the data processing module.

The processing unit is preferably a computer.

The sensing signals may be transmitted contact-free to the computer.

The sensing signals are preferably used for controlling the machining tool.

The processing unit may comprise a control unit for receiving the sensing signals, for comparing the sensing signals to nominal values, and for sending a control signal when the sensing signals deviate from the nominal values.

A tool device may further comprise an actuator for driving a control motor or an advancing device of a machine tool to which the tool device is connected for machining, wherein the control signal is supplied to the actuator.

The processing unit may process the sensing signals on-line and generate on-line the control signals.

The tool device may further comprise an energy source in the form of an accumulator, a battery, or an external energy supply.

The machining tool may comprise wire strain gauges.

Advantageously, the machining tool comprises a machining portion and the wire strain gauges are connected to the machining portion.

The at least one sensor is preferably an endoscopic optical system and the sensing signals are optical signals transmitted by the endoscopic optical system.

The tool device may further comprise a tool receiving unit for receiving the machining tool and an illumination system, including a mark projecting system connected to the tool receiving unit for illuminating the machining area.

The at least one sensor in the form of an endoscopic optical system is connected to a plurality of viewports provided at the machining tool.

The inventive tool device is an intelligent tool because already during or directly after machining the sensor can monitor whether the working area meets to the required specifications. The sensor monitors at least one portion of the machining area of the workpiece so that during machining or directly thereafter a control with respect to the machining result is possible. When errors with regard to machining of the workpiece occur, the processing unit to which the signals are sent for processing, can react correspondingly, for example, may emit a control signal so that during or directly after machining of the workpiece corrective measures can be taken.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 7.

In the tool device to be described in the following, the machining result is continuously measured and, based on the measured results, the machining tool and/or the workpiece to be machined are adjusted on line until the desired machining result is obtained. Between the machining and measuring cycles at the workpiece, it is not necessary to displace and/or exchange the machining tool and/or the workpiece. Instead, the machining result, for example, the roundness of a bore, is directly measured processed during machining and so that machining errors can be detected immediately and can be accordingly corrected. The finish-machined workpiece thus no longer requires further testing. Since a possible correction can be performed during machining, very short machining times and an especially high product quality can be obtained. Furthermore, a very long service life of the tool device can be achieved because, due to the on-line measurement and on-line processing during machining, the respective tool device can be used for machining with an optimized operation time.

It is also possible to perform first machining of the workpiece by the machining tool and to measure and process directly thereafter the machining result. When the machining result does not correspond to the required specifications, directly subsequently the machining tool and/or the workpiece are corrected by the required amount and a corrective machining is performed. While in the first mentioned embodiment of the invention the measurement, the processing, and the possible correction take place during machining, in the latter case the workpiece is first machined, subsequently measured, and the data processed in order to then perform an optional corrective machining process. In the following, the measurement during machining of the workpiece will be explained in more detail. The measurement and processing after machining is performed in an analogous manner with a respective time delay.

Figure 1:
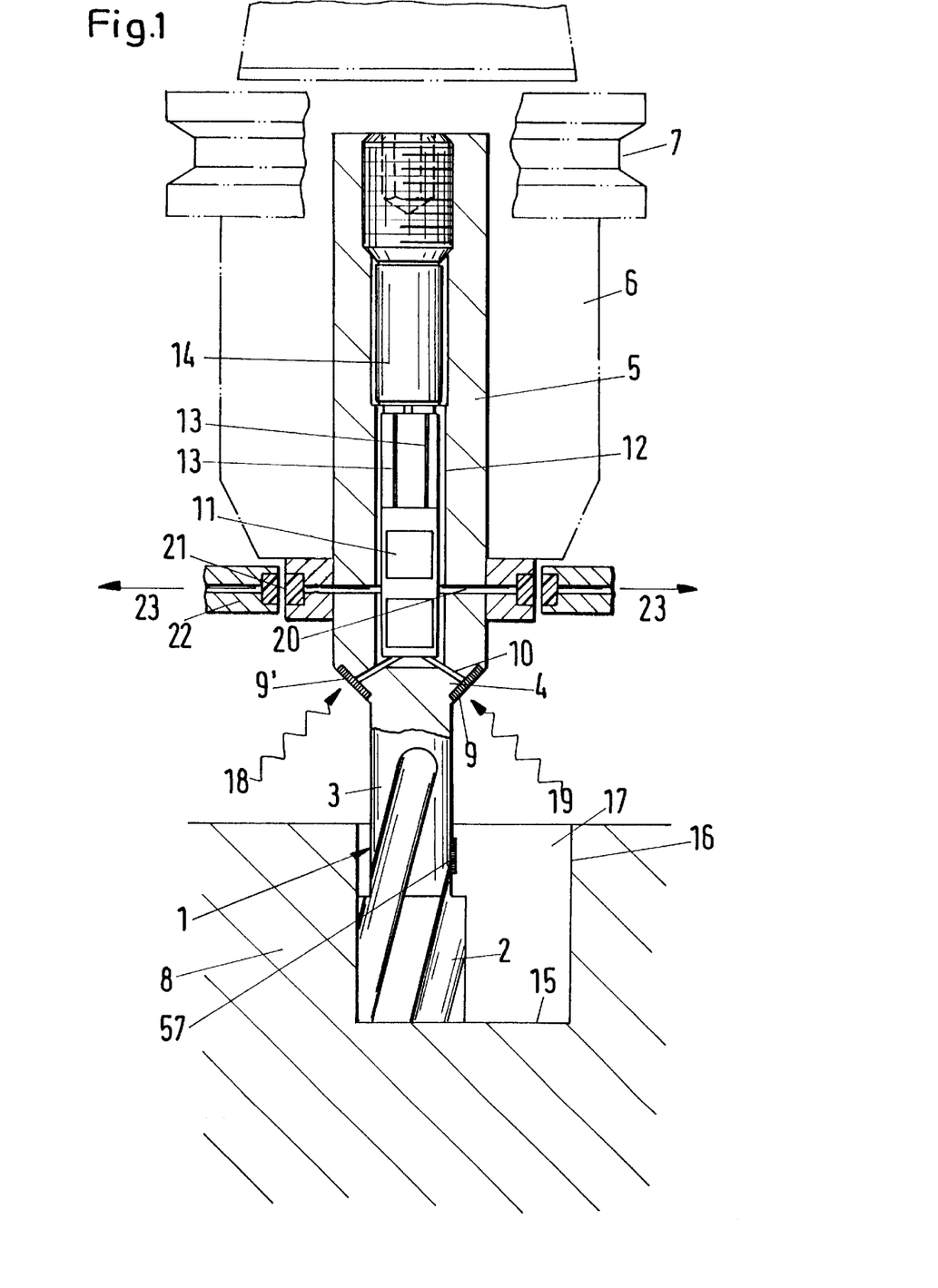
FIG. 1 is a schematic representation, partly in section, of a first embodiment of the inventive tool device.

In the embodiment according to FIG. 1, the machining tool 1 is in the form of a circular milling device. It has a milling or machining portion 2 which is embodied in a manner known per se. The machining (milling) portion 2 is provided at one end with a neck 3 having a diameter that is smaller than the diameter of the machining portion 2. At a distance to the machining portion 2, the neck 3 has connected thereto a cone portion 4 that forms a transition into the clamping shaft 5. The clamping shaft 5 is used to clamp the machining tool 1 in a tool receiving unit 6 of the tool device in a manner known per se. The tool receiving unit 6 is indicated with dash-dotted lines in FIG. 1 and comprises a gripping groove 7 which can be engaged by the gripping device of a manipulating device, for example, a tool changer, in a manner known per se. The tool receiving unit 6 is to be inserted into the spindle unit of a machine tool and is rotated in a manner known per se for machining.

The cone portion 4 of the machining tool 1 tapers in the direction toward the neck 3. As shown in FIG. 1, the cone 4 is positioned at an axial distance to the tool receiving unit 6 and to the workpiece 8 that is to be machined by the machining tool 1. The cone portion 4 is provided with at least one photosensor (photodiode) 9 which is preferably a photosensor array (photodiode array). With it the machining area of the tool 1 can be monitored in a manner to be disclosed in the following. Since the machining tool 1 during circular milling is driven at high rpm, a single photosensor or photodiode 9 is in general sufficient. For increasing the measuring precision, it may be advantageous to provide at least two photosensors 9 at the cone portion 4 of the machining tool 1. In the shown embodiment, two photosensors 9, 9' are provided which, however, monitor different areas at the workpiece 8 during machining. Each photosensor 9, 9' is connected with lines 10 to an electronic data processing module 11 which is housed in an axial receiving element 12 of the clamping shaft 5. The data processing module 11 is connected via lines 13 to the energy source 14 which is also arranged within the clamping shaft 5 and which, for example, is in the form of an accumulator or a battery. An external energy supply is also possible.

Through the receiving element 12 a cooling medium can be supplied during machining of the workpiece 8 in a known manner. The data processing module 11, the lines 13, and the energy source 14 are encapsulated for this reason.

The photosensors 9, 9' are arranged at the cone portion 4 such that the surfaces 15 and 16 of the workpiece 8 to be machined as well as its upper side within the machining area can be detected therewith. The surface 15 in the shown embodiment is the bottom of the blind bore 17 while the surface 16 is the sidewall of the blind bore 17. The milling portion 2 has accordingly end face cutters for machining the bottom 15 and circumferential cutters for machining the sidewall of the blind bore 17. The photosensors 9, 9' detect the machined surfaces 15, 16 and the upper side of the workpiece, i.e., the bore edge. This is shown in FIG. 1 with corresponding arrows 18, 19, indicating the receiving signals 18, 19 that are supplied via lines 10 to the data processing module 11. The module 11 is connected via lines 20 to a transmitting ring 21 provided at the clamping shaft 5 which is surrounded at a short distance by a further transmitting ring 22. The two transmitting rings 21, 22 form contacts, respectively, sending and receiving units for an electronic signal transmission. The signals emitted by the photosensors 9, 9' are transmitted (indicated in FIG. 1 by arrows 23) via this interface to an externally positioned (non-represented) computer.

During machining of the workpiece 8, the machining tool 1 rotates about its axis and is furthermore guided circularly about the axis of the blind bore 17. The bottom 15 and the sidewall 16 of the blind bore 17 as well as the upper surface of the workpiece are monitored by the photosensors 9, 9' during machining, i.e., during the milling process. The photosensors 9, 9' transmit corresponding signals to the computer that processes the signals online and compares the actual signals to nominal values saved in the computer. When, for example, the blind bore 17 is not machined so as to be exactly round, this is immediately detected during processing within the computer. The computer then sends a corresponding control signal to the machine tool which is corrected such that the blind bore 17 is machined to be exactly round. In the same manner, other criteria during manufacture of the blind bore 17 can be monitored and corrected, for example, the cylindrical embodiment of the sidewall 16. When, for example, the sidewall 16 should be of an undesirable conical embodiment, the computer can detect this error based on the sensing signals transmitted by the photosensors 9 so that corresponding control and correction signals can be sent to the machine tool.

Based on this visual detection provided by the machining tool, it is possible to detect errors already during machining and correct them instantly. This ensures that the machined workpiece 8 has the required machining quality so that a subsequent testing, respectively, quality control by hand or on a separate testing station and/or with a special tool can be omitted.

The photosensors 9, 9' can be line scanning or field scanning photosensor arrays. The signal transmission is carried out contact-free via transmitting rings 21, 22 so that no disturbances during workpiece machining is to be expected especially since the transmitting rings 21, 22 are positioned at a sufficient distance from the machining area of the working tool 1. The transmitting ring 22 is stationary while the other transmitting ring 21 is rotationally fixedly connected to the machining tool 1.

For supporting the direct measurement of the bore geometry with the optical sensors 9, 9', wire strain gauges 57 with a corresponding circuit can be provided at the tool 1 at suitable locations. The signal amplification and processing as well as the energy supply can also be provided within the rotating machining tool 1. With the wire strain gauges 57 deformations of the workpiece 1 can be detected and the geometry of the produced bore can thus be analyzed.

Figure 2:
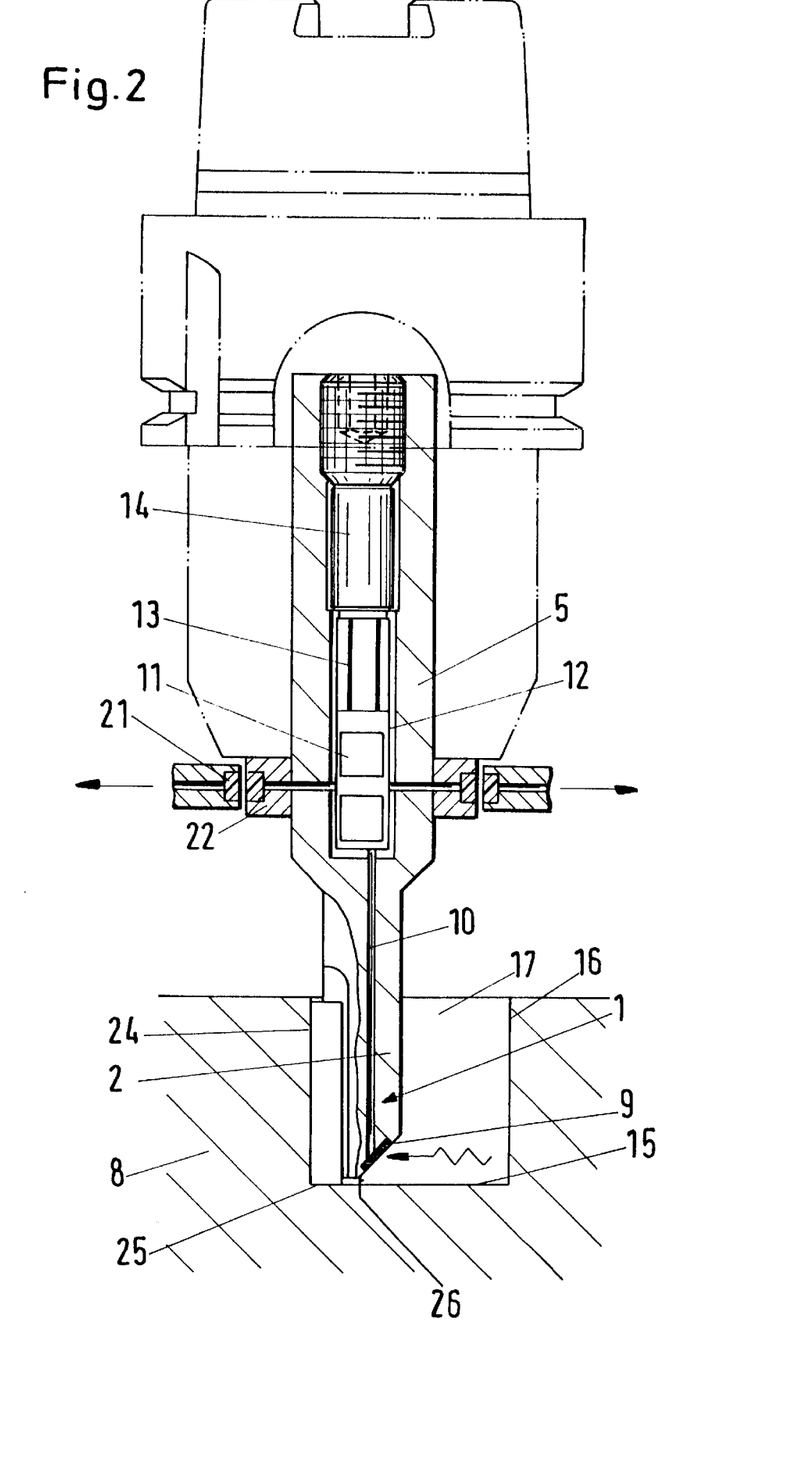
FIGS. 2 through 5 show in representations according to FIG. 1 further embodiments of the inventive tool device.

In the embodiment according to FIG. 2, only one photosensor 9 is provided at the end face of the milling portion 2 of the machining tool 1. The milling portion 2 has circumferential cutters 24 and end faces cutters 25 with which the sidewall 16 and the bottom 15 of the blind bore 17 can be manufactured.

The photosensor 9 is fastened to a slanted surface 26 at the free end of the milling portion 2. The lines 10 extend axially through the milling part 2 until they reach the processing module 11 that, as in the previous embodiment, is housed in the receiving element 12 of the clamping shaft 5.

Since the photosensor 9 is positioned at a slant to the axis of the milling part 2, it is possible to detect or monitor at the same time the bottom 15 and the sidewall 16 of the blind bore 17. The embodiment corresponds substantially to the embodiment according to FIG. 1. The signals derived from the photosensor 9 are transmitted contact free via the transmission rings 21, 22 to the computer which processes the signals in the aforementioned manner and optionally generates a corrective movement of the machining tool 1.

Figure 3:
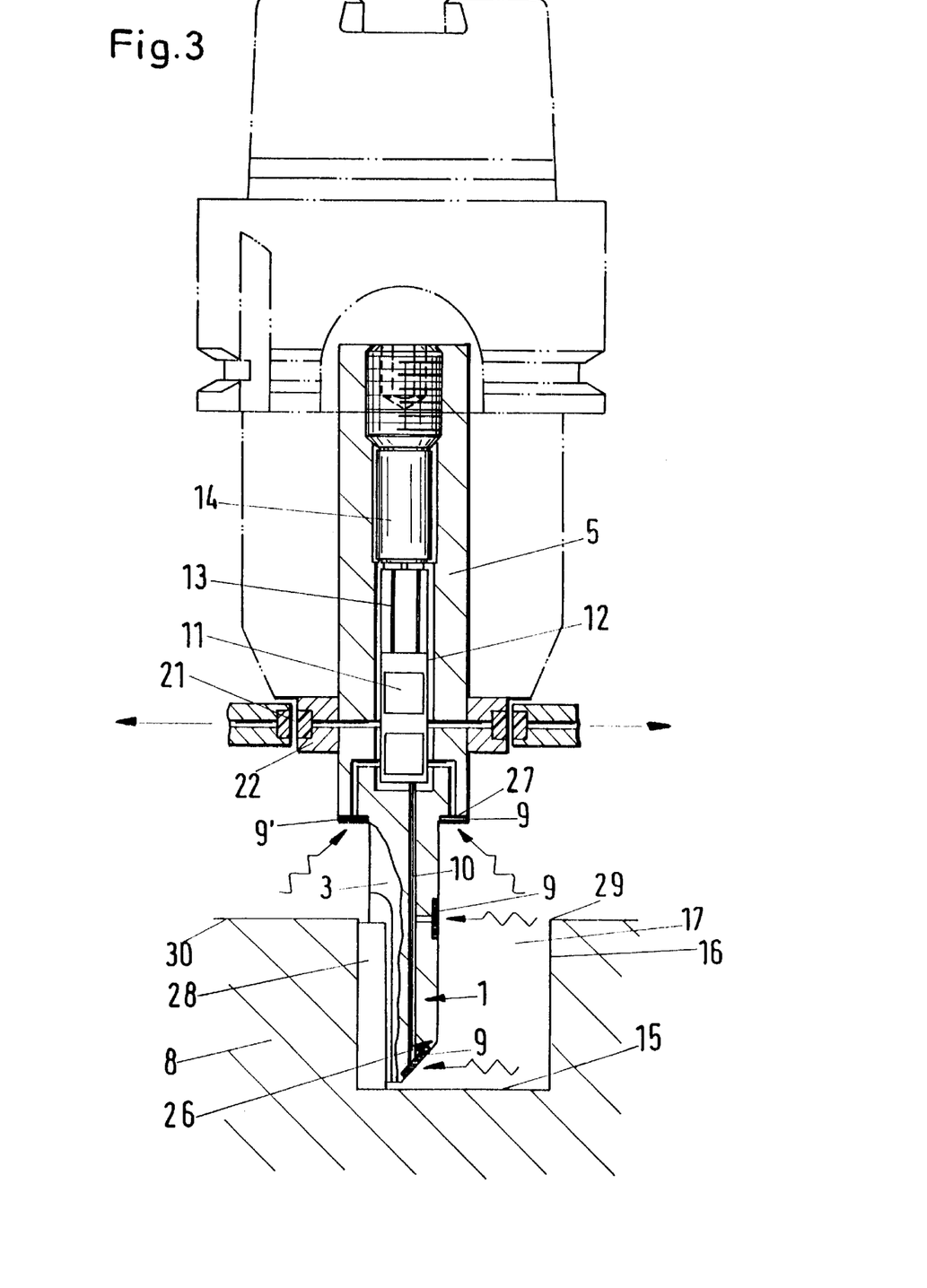

FIG. 3 shows an embodiment in which with two photosensors 9, 9' different areas of the workpiece 8 to be machined are monitored during machining. The machining tool 1 is embodied similarly to the tool according to FIG. 2. The only change is that at the transition from the neck 3 to the clamping shaft 5 the cone portion has been omitted. Instead, an annular shoulder 27 is provided which is positioned in a radial plane of the machining tool 1 and extends at a right angle to the common axis of neck 3 and clamping shaft 5. The two photosensors 9, 9' are connected to the surface of the annular shoulder 27. The milling portion 2 of the machining tool 1 has at its free end the slanted surface 26 on which another photosensor 9 is arranged. Furthermore, at least one further sensor 9 is provided in the area between the free end of the milling portion 2 and the annular shoulder 27. It is provided in the mantle surface of the milling portion 2 at a level of the end of the cutting blades 28 proximal to the neck 3.

As in the embodiment according to FIG. 2, the photosensor 9 at the free end of the milling portion 2 can monitor the bottom 15 as well as at least the lower portion of the sidewall 16 of the blind bore 17. With the centrally arranged sensor 9 in the shown embodiment the edge of the bore 29 of the blind bore 17 can be monitored. With the photosensors 9, 9' provided at the annular shoulder 27, the edge 29 and the sidewall 16 of the blind bore 17 as well as the upper side 30 of the workpiece 8 in the vicinity of the blind bore 17 can be detected. With this tool device it is thus possible to monitor completely the critical areas for manufacturing the blind bore 17 during machining. The photosensors are connected to the data processing module 11 that, as in the previous embodiments, is positioned in the central receiving element 12 of the clamping shaft 5. The transmission of the sensing signals emitted by the photosensors 9, 9' is again performed contact-free via the transmission rings 21, 22. The data processing module 11 is embodied such that the signals of the different photosensors 9, 9' can be correlated with their respective sensor. In the computer the signals are processed such that during machining of the workpiece 8 possibly occurring errors during milling of the blind bore 17 can be detected. Depending on where the machining error occurs, the machining tool is then respectively corrected controlled by the computer.

Figure 4:
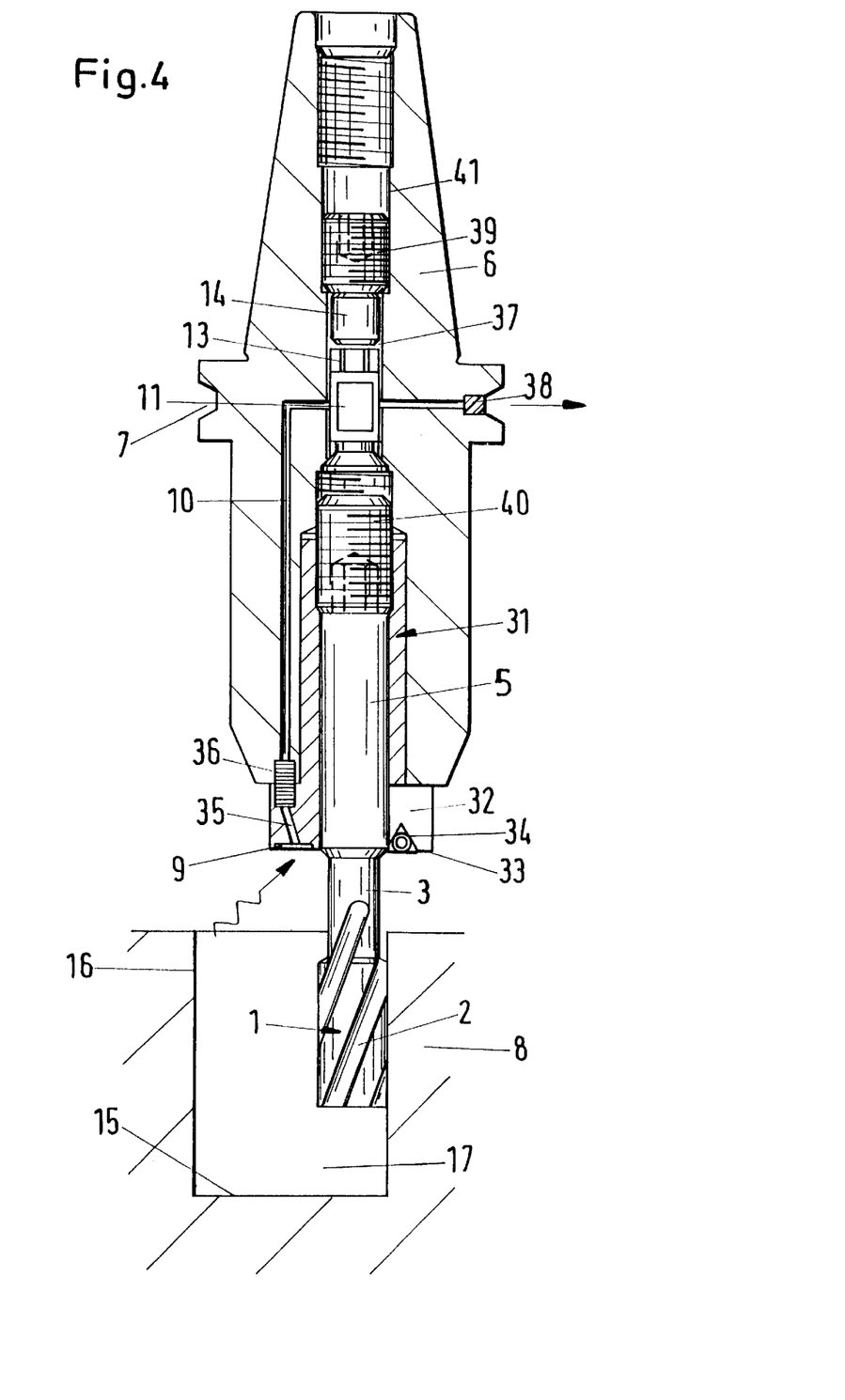

FIG. 4 shows a machining tool 1 with a milling portion 2 and a neck 3 connected thereto that has a diameter smaller than the milling portion 2 and has a transition into the clamping shaft 5. The machining tool 1 is clamped with the clamping shaft 5 in the tool receiving unit 6 in a manner known per se. In contrast to the previously described embodiments, the energy source 14, the lines 13, and the data processing module 11 are received in the tool receiving unit 6. The clamping shaft 5 is positioned in a sleeve 31 which is inserted together with the machining tool 1 into the tool receiving unit 6. The sleeve 31 is provided at the end facing the milling portion 2 with a radially outwardly projecting flange 32 which, in the shown mounted position, rests at the end face of the tool receiving unit 6. At the end face 33 of the flange 32 facing the milling portion 2 at least one photosensor 9 is attached. As in the previous embodiments, two or more photosensors 9 can be provided about the circumference of the flange 32. The end face 33 of the flange 32 is positioned in a radial plane of the sleeve 31 at a distance from the milling portion 2. At the end face 33 of the flange 32 a cutting blade (tip) 34, preferably an indexable cutting blade (tip), is fastened with which core or counter drilling can be performed.

The photosensor 9 is connected with line 35 to the data interface 36 that is connected via line 10 to the data processing module 11. The line 35 is provided in the flange 32 of the sleeve 31 while the line 10 extends through the tool receiving unit 6. The data processing module 11, the lines 13, and the energy source 14 are provided within the central axial hollow interior 37 of the tool receiving unit 6 which, as in the previous embodiments, is an expanding mandrel. The data processing module 11 is provided with a signal transmitter 38 which is advantageously arranged in the gripping groove 7 of the tool receiving unit 6. Via the signal transmitter 38, the sensing signals coming from the photosensor 9 and processed within the processing module 11 are transmitted to the non-represented computer.

In the hollow interior 37 of the tool receiving unit 6, the data processing module 11, the lines 13, and the energy source 14 are arranged between the two screw elements 39 and 40. The screw element 40 projects with play into the sleeve 31 and is threaded into a threaded bore 41 of the tool receiving unit 6. The screw element 39 is likewise threaded into a threaded bore. The screw element 40 serves as an adjustable axial abutment for the machining tool 1.

Since the photosensor 9 is arranged perpendicularly to the axis of the machining tool 1, it can monitor the cylindrical sidewall 16 as well as the bottom 15 and the edge 29 of the blind bore 17 during milling of the blind bore 17 into the workpiece 8. Thus, with this tool device online monitoring and correction are also possible. The computer continuously measures and monitors the machining result. When the machining result does not comply with the desired specifications, the machining tool 1 is corrected on line, as in the previously disclosed embodiments, so that already during machining the required correction is performed.

Figure 5:
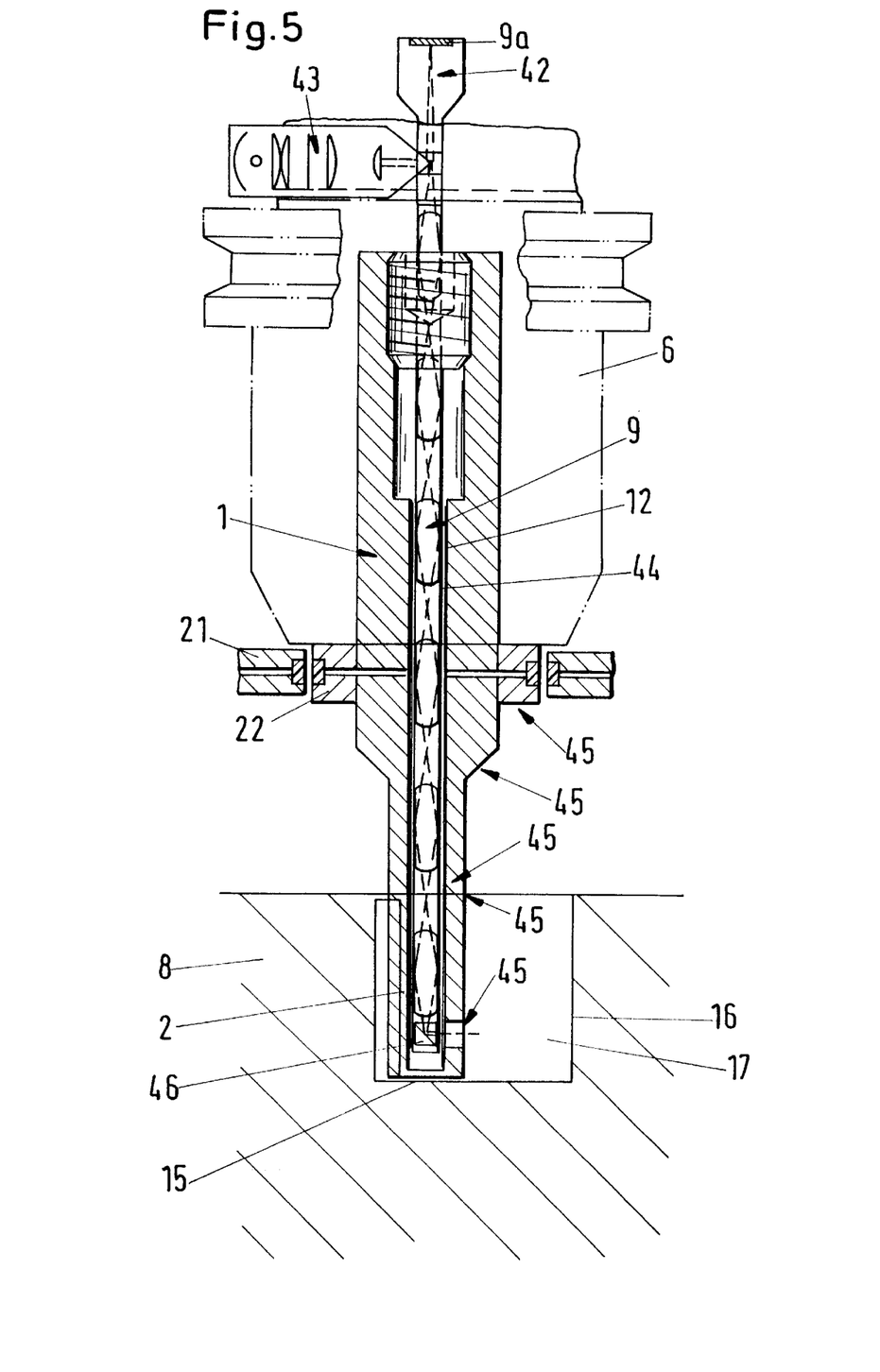

In the embodiment according to FIG. 5, a tool device with machining tool 1 is used that is of the same design as in the embodiment of FIG. 1. However, the photosensor 9 is an endoscopic optical system that is centrally and axially guided through the receiving element 12 of the machining tool 1. The endoscopic optical system 9 extends through the receiving unit 6 to a camera head 42 which is stationary but can also be movable. Within the receiving unit 6 an illumination system 43, including a mark projecting system, is provided with which in a known manner the required light for the endoscopic optical system 9 can be provided.

The endoscopic optical system 9 has a thin tube 44 that extends through the central receiving element of the machining tool 1 and that is provided with a lens system and a fiberglass optic. The machining tool 1 comprises at least one view port 45 through which the endoscopic optical system can view the machining area of the machining tool. As indicated in FIG. 5 by arrows, the viewports 45 can be provided at different locations of the machining tool. The position of the view port 45 depends on the type of machining to be performed at the workpiece 8 and/or which workpiece area should be monitored during machining. Of course, it is also possible to provide two or more viewports 45 at different locations of the machining tool 1. The endoscopic optical system 9 is arranged such that viewing of the machining result is possible via the respective view ports 45. When the machining tool 1 has two or more viewports 45 at different locations, it is advantageous to provide for displaceability of the tube 44 of the endoscopic optical system 9 within the receiving element 12 of the tool 1 to selectively connect the system 9 to a respective view port 45.

The illumination system 43 can be arranged external to the tool receiving unit 6, for example, within the free working space. It is important that at the free end of the tube 44 a monitoring member 46 is provided at the level of the respective view port 45.

As shown in the embodiment according to FIG. 1, the electronic signal transmission is performed via the two transmission rings 21, 22.

In the shown embodiment of FIG. 5, the monitoring member 46 is provided near the free end of the milling portion 2 of the machining tool 1. With the corresponding view port 45 it is thus possible to monitor the lower portion of the blind bore 17 during machining. The axis of the lower view port 45 extends radially to the axis of the machining tool 1 so that the sidewall 16 of the blindbore 17 can be monitored. The axis of the view port 45 can, of course, also extend at a slant in the downward direction so that at the same time the bottom 15 of the blind bore 17 can also be monitored during machining.

The areas of the workpiece 8 detected by the monitoring member 46 are transmitted in a known manner to the camera head 42 in the form of light signals. The camera head 42 can be embodied in a manner known in connection with endoscopic optical systems or may be, for example, a photosensor array 9a according to the previously disclosed embodiments. Downstream of the camera head 42, the signals are then processed as in the previous embodiments.

Depending on the position of the view port 45 within the milling portion 2, other machining areas of the machining tool 1 and thus other machining locations at the workpiece 8 can be monitored. In general, it is also possible, for example, by providing two viewports at different locations of the tool 1, to monitor different machining areas at the workpiece 8 with the endoscopic optical system 9. In order to be able to correlate the respective information optically, it is possible to use polarized light. In this case, the signals of the respective view ports 45 can be correlated with different polarization. A further possibility of correlation would be the use of colored light and a corresponding selective beam divider. The different colors can thus also be used for correlating the transmitted signals to the respective viewport 45.

Figure 5A:
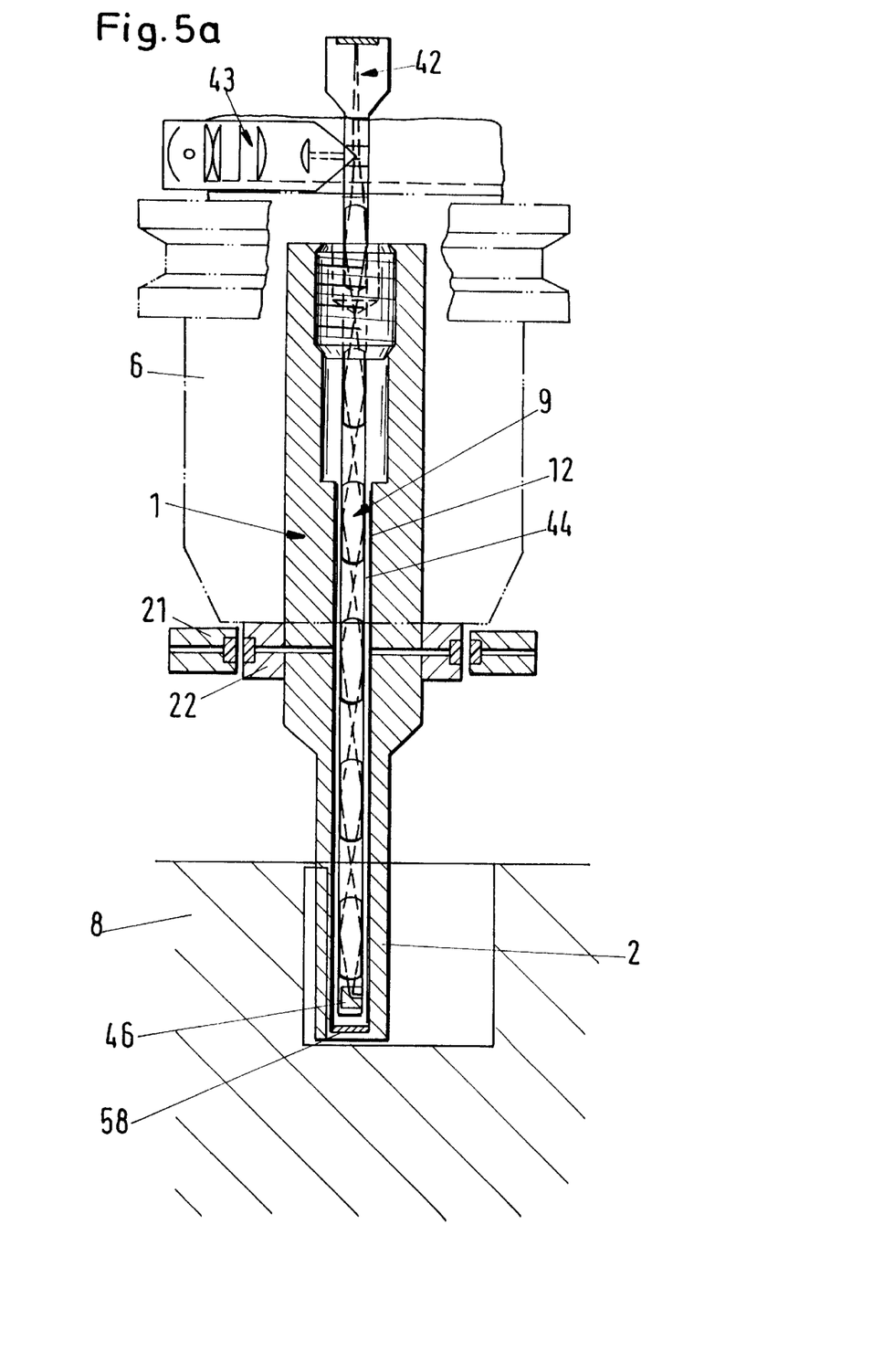
FIG. 5a shows in a representation according to FIG. 1 a further embodiment of the inventive tool device.

The deflection of the machining tool during machining can be performed according to the principle schematically shown in FIG. 5a. The optical system of the endoscopic monitoring device 9 is rigidly connected to the tool receiving unit 6 and is guided through the machining tool 1 with a sufficient spacing so as to avoid contact. The direction of viewing of the optical system is directed onto a line plate (reticle plate) 58 which is connected to the bore of the tool 1. As soon as the milling action of the machining tool 1 is started, cutting forces occur which deform mainly the blade area of the machining tool 1. This results in a relative movement between the machining tool 1 and the endoscopic optical system 9 which can be made visible by monitoring the movement of the line plate (reticle plate) 58. The detection of the image signals is again performed via photo array 9a at the end of the endoscopic optical system 9. The further processing of the signals is carried out in the manner disclosed in connection with FIG. 5, which will be explained in more detail in connection with FIGS. 6 and 7. In order to avoid oscillation of the endoscopic optical system 9 during machining, it is advantageously embodied as short as possible. Optionally, the endoscopic optical system 9 can be additionally supported within the shaft portion 5 of the machining tool 1 because in this area almost no deformation will occur. Otherwise, this embodiment is identical to the machining tool of FIG. 5.

The tool devices shown in FIG. 1 through FIGS. 5, 5a are milling tools, however, this is only an exemplary embodiment. Other tools, for example, boring tools, hollowing tools, turn-out tools, grinding tools etc. can also be embodied as "seeing" tools able to perform an on-line measurement as well as an on-line correction.

Figure 6:
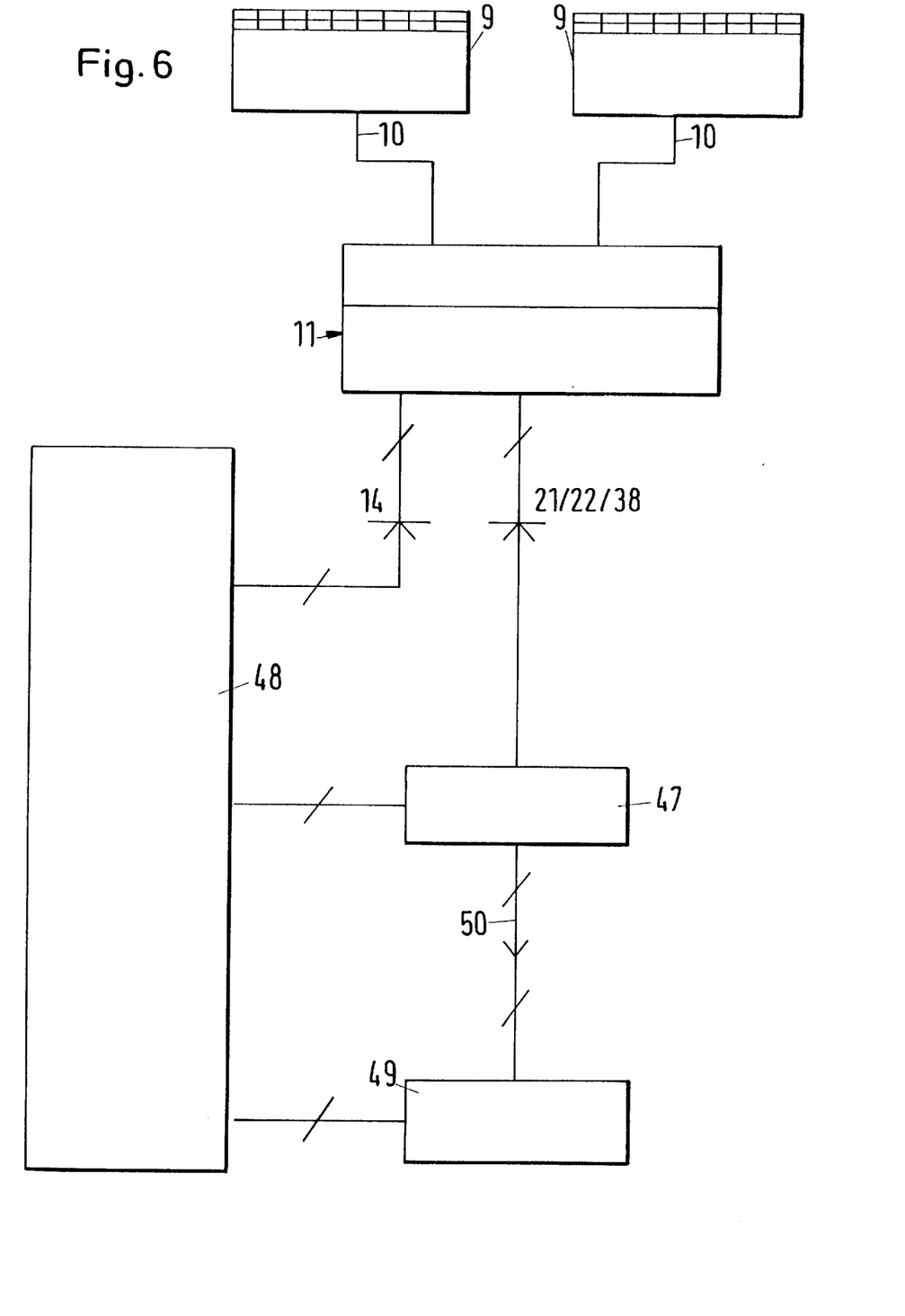
FIG. 6 is a schematic representation of the signal processing for the inventive tool device.

With the aid of FIG. 6 the control of the machining tool, respectively, of the tool device is to be explained in more detail. As an example, it is presumed that the machining tool 1 is provided with two photosensors 9 which are embodied each as a photosensor array. They perform a first or primary signal processing. The signals are then guided via lines 10 to the data processing module 11. The data processing module 11 is a signal processor which comprises a signal processing unit in which the signals are combined, processed, and compressed. Via the contacts 21, 22 (transmitting rings), respectively, 38 the processed data of data processing module 11 are supplied to a control unit 47 which is a component of the computer. The control unit 47 is connected to the microprocessor 48 of the computer. The energy source 14 which is shown schematically in FIG. 6, is also connected to the microprocessor 48.

The control unit 47 is not only supplied with the actual values in the form of the signals derived from the photosensors but also with nominal values supplied by the microprocessor 48. In the control unit 47 a nominal/actual value comparison takes place. When deviations are detected, actuators 49 of the machine tool are supplied with corresponding control signals 50. The actuators 49 can be used to control control motors, advancing drives etc. of the machine tool with which the machining tools are correspondingly corrected. The control of the actuators 49 advantageously is performed by the microprocessor 48.

The array from the sensors 9 to the energy source 14, respectively, the contacts 21, 22, 38 is part of the machining tool, while the other components of the represented control is to be viewed as part of the machine tool. Due to the disclosed real time control, which is integrated partly into the machining tool 1, the machining result can be monitored and processed during machining and, based on the processing results, can be corrected on-line.

Figure 7:
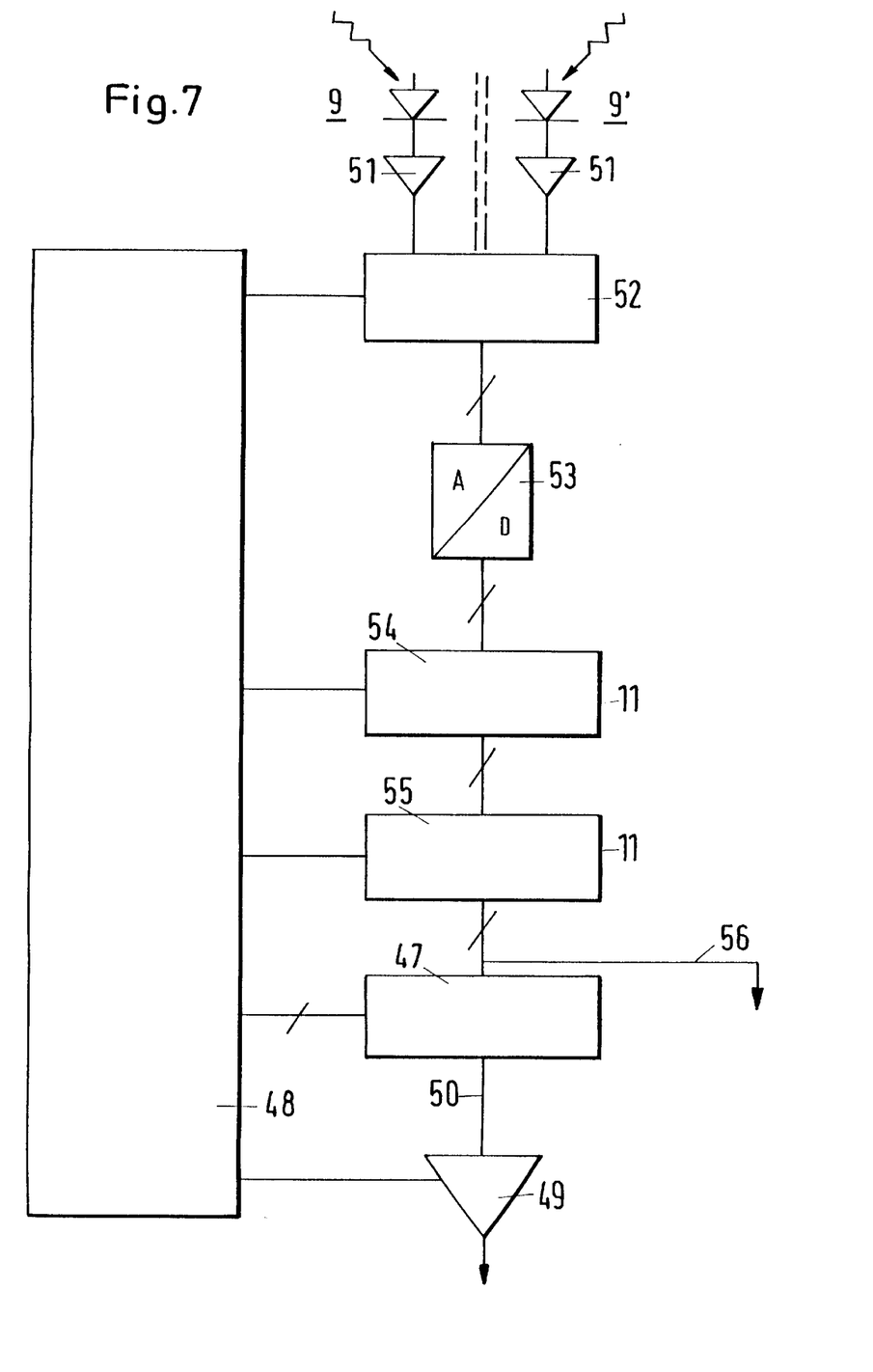
FIG. 7 is an electronic circuit for use with the inventive tool device.

FIG. 7 shows an example for the corresponding electronic device. The photosensors 9, 9' are embodied as photodiode lines which are connected with a respective amplifier 51 to a respective multiplexer 52. The multiplexer is connected via an analog-digital convertor 53 to the data processing module 11. The data processing module 11 comprises a digital signal processor 54 that is connected to the analog/digital convertor 53. Within the signal processor 54 the digital signals are amplified and extracted. The thus processed signals are stored in a data memory 55 of the data processing module 11. These data are the actual data which characterize the respective machining result at the workpiece. The signal processor 54 and the data memory 55 are connected to the microprocessor 48. The microprocessor 48 supplies nominal data to the digital control unit 47 in which the nominal data are compared to the actual data.

Depending on the result of this comparison, control signals 50 are supplied to the respective actuators 49 which are connected to the microprocessor 48. The control signals 50 are processed via a non-represented digital-analog convertor into control signals for a control motor, an advancing drive etc. of the machine tool.

The actual data memorized within the data memory 55 can be retrieved via line 56 so that the respective machining result, for example, in the form of measured data can be printed or displayed on a display unit. Thus, a machining protocol of a machining process of the respective workpiece can be produced.

The control unit 47 generates in real time the control signals for the respective machine tool in order to move the machining tool and/or the workpiece correspondingly in order to correct deviations from the nominal (desired) result. The required electronic parts are comprised of highly integrated electronic microchips which can also be positioned in small machining tools. The photosensors are preferably integrated miniaturized photosensor arrays which are line or field arrays. The sensor signals are compressed and converted into robust digital signals by the analog-digital convertor 53. In order to maintain the data rate small and to thus keep the processing time at a minimum, the data are compressed within the data processing module 11. The control unit 47 processes the machining result online and generates online the corresponding control signals 50. The image-producing sensors 9 have a lens upstream thereof, respectively, an endoscope part upstream thereof.

Since the photosensors continuously monitor the machining of the workpiece 8 performed by the machining tool 1, a continuous comparison between the actual data and the nominal data is performed. Within the data memory 55 the actual data are advantageously stored only until the comparison of the nominal and actual data has been performed by the control unit 47. Accordingly, the memory size can be kept small. However, with a corresponding large size of the data memory 55 it is, of course, also possible to store all data resulting from the machining process. It is advantageous in this context to compress the actual data. It is then possible to have the measured data available after completion of the machining process so that they can be supplied via line 56 to be subsequently read on a display or printed.

The present invention is, of course, in no way restricted to the specific disclosure of the specification and drawings, but also encompasses any modifications within the scope of the appended claims.

What we claim is:

1. A tool device for machining workpieces, said tool device comprising:
   a machining tool;
   at least one sensor, which is a photodiode or a photodiode array, oriented toward a machining area of a workpiece to be machined by said machining tool, wherein said at least one sensor senses at least a portion of the machining area and produces sensing signals;
   at least one processing unit for receiving and processing said sensing signals of said at least one sensor.

2. A tool device according to claim 1, wherein said at least one sensor is connected to an exterior of said machining tool.

3. A tool device according to claim 1, wherein said machining tool comprises a machining portion and wherein said at least one sensor is connected to said machining portion.

4. A tool device according to claim 1, wherein said machining tool has a neck and wherein said at least one sensor is connected to said neck.

5. A tool device according to claim 1, wherein said at least one sensor is positioned inside said machining tool.

6. A tool device according to claim 1, further comprising a tool receiving unit for receiving said machining tool, wherein said at least one sensor is connected to an exterior of said tool receiving unit.

7. A tool device according to claim 6, wherein said at least one sensor is positioned inside said tool receiving unit.

8. A tool device according to claim 1, wherein said processing unit is a computer.

9. A tool device according to claim 8, wherein said sensing signals are transmitted contact-free to said computer.

10. A tool device according to claim 1, wherein said sensing signals are used for controlling said machining tool.

11. A tool device according to claim 10, wherein said processing unit comprises a control unit for receiving said sensing signals, for comparing said sensing signals to nominal values, and for sending a control signal when said sensing signals deviate from the nominal values.

12. A tool device according to claim 11, further comprising an actuator for driving a control motor or an advancing device of a machine tool to which said tool device is connected for machining, wherein said control signal is supplied to said actuator.

13. A tool device according to claim 11, wherein said processing unit processes said sensing signals on-line and generates on-line said control signal.

14. A tool device according to claim 1, further comprising an energy source selected from the group consisting of an accumulator, a battery, and an external energy supply.

15. A tool device according to claim 1, wherein said machining tool comprises wire strain gauges.

16. A tool device according to claim 15, wherein said machining tool comprises a machining portion and wherein said wire strain gauges are connected to said machining portion.

17. A tool device according to claim 1, further comprising:
- a tool receiving unit for receiving said machining tool;
- an illumination system, including a mark projecting system, connected to said tool receiving unit for illuminating the machining area.

18. A tool device for machining workpieces, said tool device comprising:
- a machining tool;
- at least one sensor oriented toward a machining area of a workpiece to be machined by said machining tool, wherein said at least one sensor senses at least a portion of the machining area and produces sensing signals, wherein said at least one sensor is an endoscopic optical system;
- at least one processing unit for receiving and processing said sensing signals of said at least one sensor.

19. A tool device according to claim 18, wherein said endoscopic optical system extends through said machining tool and comprises a tube having at a free end thereof a monitoring member.

20. A tool device according to claim 19, wherein said machining tool comprises at least one view port for said monitoring member.

21. A tool device according to claim 19, wherein said machining tool comprises at least one fixedly attached reticle plate positioned within a viewing direction of said monitoring member.

22. A tool device according to claim 21, wherein said machining tool comprises a machining portion and wherein said reticle plate is located in a bore of said machining portion.

23. A tool device for machining workpieces, said tool device comprising:
- a machining tool;
- at least one sensor oriented toward a machining area of a workpiece to be machined by said machining tool, wherein said at least one sensor senses at least a portion of the machining area and produces sensing signals;
- at least one processing unit for receiving and processing said sensing signals of said at least one sensor;
- a data processing module, wherein said at least one sensor is connected to said data processing module;
- said machining tool comprising a clamping shaft for clamping said machining tool, wherein said data processing module is positioned within said clamping shaft.

24. A tool device according to claim 23, wherein said data processing module is connected within said machining tool.

25. A tool device according to claim 23, further comprising a tool receiving unit for receiving said machining tool, wherein said data processing module is mounted within said tool receiving unit.

26. A tool device according to claim 23, wherein said data processing module comprises a signal processor.

27. A tool device according to claim 26, wherein said data processing module comprises a data memory connected downstream of said signal processor.

28. A tool device according to claim 23, further comprising an analog-digital convertor connected upstream of said data processing module.

29. A tool device according to claim 28, further comprising a multiplexer to which said at least one sensor is connected.

30. A tool device according to claim 29, wherein said analog-digital converter is connected between said multiplexer and said data processing module.

31. A tool device for machining workpieces, said tool device comprising:
- a machining tool;
- at least one sensor oriented toward a machining area of a workpiece to be machined by said machining tool, wherein said at least one sensor senses at least a portion of the machining area and produces sensing signals;
- at least one processing unit for receiving and processing said sensing signals of said at least one sensor;
- wherein said at least one sensor is an endoscopic optical system and wherein said sensing signals are optical signals transmitted by said endoscopic optical system.

32. A tool device for machining workpieces, said tool device comprising:
- a machining tool;
- at least one sensor oriented toward a machining area of a workpiece to be machined by said machining tool, wherein said at least one sensor senses at least a portion of the machining area and produces sensing signals;
- at least one processing unit for receiving and processing said sensing signals of said at least one sensor;
- wherein said at least one sensor is an endoscopic optical system and wherein said machining tool comprises a plurality of view ports to which said endoscopic optical system is selectively connected.

* * * * *